United States Patent
Wang et al.

(10) Patent No.: US 12,204,117 B2
(45) Date of Patent: Jan. 21, 2025

(54) CAMERA UNIT AND ELECTRONIC DEVICE

(71) Applicant: BEIJING XIAOMI MOBILE SOFTWARE CO., LTD., Beijing (CN)

(72) Inventors: Hui Wang, Beijing (CN); Zongbao Yang, Beijing (CN); Yan Zheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 890 days.

(21) Appl. No.: 17/349,773

(22) Filed: Jun. 16, 2021

(65) Prior Publication Data

US 2022/0276413 A1 Sep. 1, 2022

(30) Foreign Application Priority Data

Feb. 26, 2021 (CN) .......................... 202120433671.2

(51) Int. Cl.
| | |
|---|---|
| *G02B 3/14* | (2006.01) |
| *G02B 7/02* | (2021.01) |
| *G02B 7/10* | (2021.01) |
| *H04N 23/55* | (2023.01) |

(52) U.S. Cl.
CPC .............. *G02B 3/14* (2013.01); *G02B 7/021* (2013.01); *G02B 7/023* (2013.01); *G02B 7/10* (2013.01); *H04N 23/55* (2023.01)

(58) Field of Classification Search
CPC .......... G02B 3/14; G02B 7/021; G02B 7/023; G02B 7/10; G02B 7/08; G02B 13/001; G02B 26/004; G02B 3/12; H04N 23/55; H04N 23/57; G03B 2205/0007; G03B 2205/0046; G03B 2205/0084; G03B 30/00; G03B 17/12
See application file for complete search history.

(56) References Cited

U.S. PATENT DOCUMENTS

| | | | |
|---|---|---|---|
| 2019/0228562 A1* | 7/2019 | Song | .................... G02B 3/12 |
| 2020/0124839 A1 | 4/2020 | Aschwanden et al. | |

FOREIGN PATENT DOCUMENTS

| | | |
|---|---|---|
| CN | 101349795 A | 1/2009 |
| CN | 110967783 A | 4/2020 |
| JP | 2003125275 A | 4/2003 |
| JP | 2020112793 A | 7/2020 |
| KR | 20140073255 A | 6/2014 |

(Continued)

OTHER PUBLICATIONS

European Patent Application No. 21181745.7 extended Search and Opinion dated Nov. 26, 2021, 8 pages.

(Continued)

*Primary Examiner* — James C. Jones
(74) *Attorney, Agent, or Firm* — Cozen O'Connor

(57) ABSTRACT

A camera unit includes a liquid lens, a motor and a solid lens. The liquid lens includes a fixed body and a support body spaced apart from the fixed body. The liquid lens has a first optical axis. The motor includes a mover assembly and a stator assembly. The mover assembly has a first end fixedly connected to the support body and is movable along the first optical axis relative to the stator assembly to adjust curvature of the liquid lens. The stator assembly has a second end fixedly connected to the fixed body. The solid lens is fixed to the stator assembly and has a second optical axis coinciding with the first optical axis.

19 Claims, 10 Drawing Sheets

(56) References Cited

FOREIGN PATENT DOCUMENTS

| | | |
|---|---|---|
| KR | 101972302 B1 | 4/2019 |
| KR | 20190089600 A | 7/2019 |
| WO | WO 2020173393 A1 | 9/2020 |
| WO | WO 2020235667 A1 | 11/2020 |

OTHER PUBLICATIONS

Japanese Patent Application No. 2021-105961 Office Action dated Mar. 22, 2022, 4 pages.
Japanese Patent Application No. 2021-105961 English translation of Office Action dated Mar. 22, 2022, 6 pages.
Korean Patent Application No. 10-2021-0080667, Office Action dated Aug. 29, 2022, 7 pages.
Korean Patent Application No. 10-2021-0080667, English translation of Office Action dated Aug. 29, 2022, 8 pages.

* cited by examiner

CAMERA UNIT AND ELECTRONIC DEVICE

CROSS-REFERENCE TO RELATED APPLICATION

This application claims priority to and benefits of Chinese Patent Application Serial No. 202120433671.2, filed with National Intellectual Property Administration of PRC on Feb. 26, 2021, the entire content of which is incorporated herein by reference.

FIELD

The present disclosure relates to a field of electronic device technologies, and more particularly to a camera unit and an electronic device.

BACKGROUND

Cameras are an important part of electronic devices (such as mobile phones, tablet computers, cameras, surveillance devices and unmanned aerial vehicles) for capturing images. In order to be beautiful and convenient to carry, electronic devices are required to be miniaturized, and cameras with the same focusing range are also required to be smaller.

Liquid lenses are increasingly applied to electronic devices (such as mobile phones and tablet computers) due to their light weight and the capability to adapt to the development of miniaturization of the electronic devices. However, camera units to which liquid lenses are applied have a low yield, leading to high costs of the electronic devices using such liquid lenses.

SUMMARY

According to a first aspect of embodiments of the present disclosure, a camera unit is provided, including a liquid lens, a motor and a solid lens. The liquid lens includes a fixed body and a support body spaced apart from the fixed body. The liquid lens has a first optical axis. The motor includes a mover assembly and a stator assembly. The mover assembly has a first end fixedly connected to the support body and is movable along the first optical axis relative to the stator assembly to adjust curvature of the liquid lens. The stator assembly has a second end fixedly connected to the fixed body. The solid lens is fixed to the stator assembly and has a second optical axis coinciding with the first optical axis.

According to a second aspect of the embodiments of the present disclosure, an electronic device is further provided, including a controller and a camera unit according to any one of the above embodiments. The camera unit includes a liquid lens, a motor and a solid lens. The liquid lens includes a fixed body and a support body spaced apart from the fixed body. The liquid lens has a first optical axis. The motor includes a mover assembly and a stator assembly. The mover assembly has a first end fixedly connected to the support body and is movable along the first optical axis relative to the stator assembly to adjust curvature of the liquid lens. The stator assembly has a second end fixedly connected to the fixed body. The solid lens is fixed to the stator assembly and has a second optical axis coinciding with the first optical axis. The controller is in a communication connection with the motor.

Figure 1:
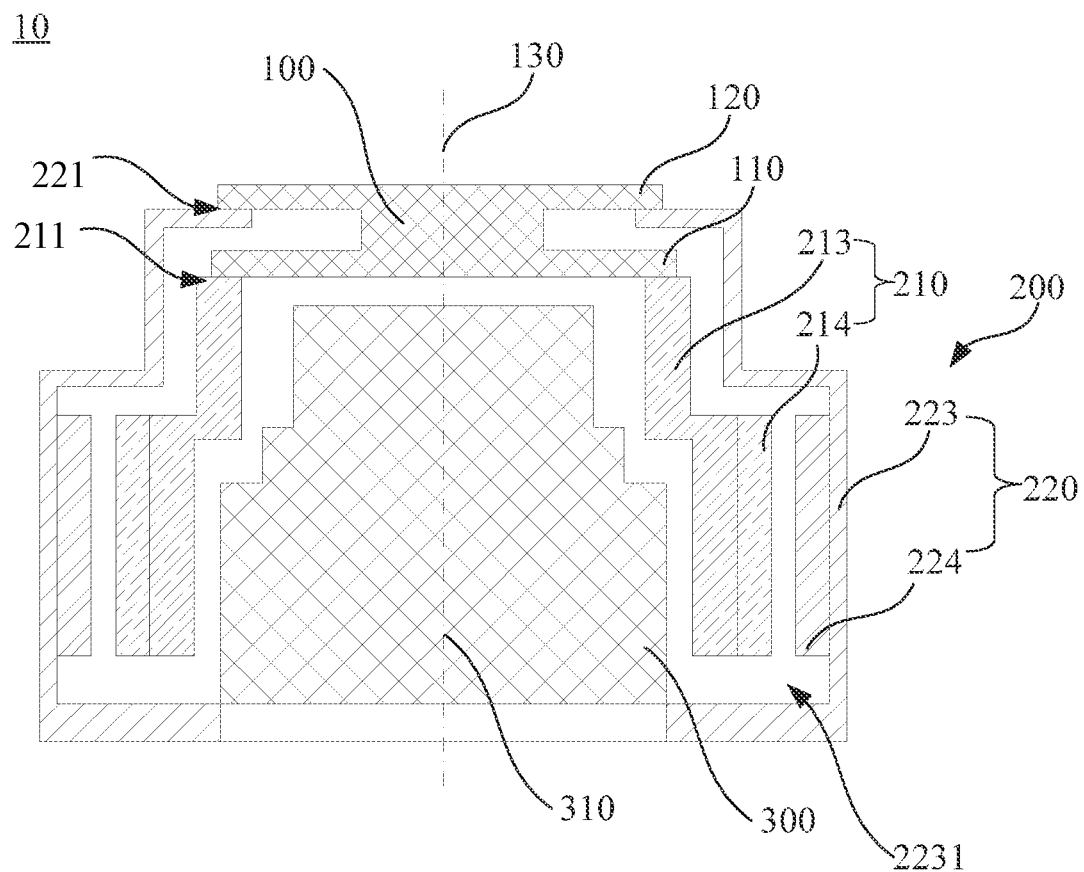
FIG. 1 is a schematic semi-sectional view of a camera unit according to an embodiment.

The accompanying drawings herein constituting a part of the present disclosure are intended to provide further understanding of the present disclosure. Illustrative embodiments of the present disclosure and their descriptions are intended to interpret the present disclosure and do not constitute any improper limitation on the present disclosure.

In order to more clearly illustrate the technical solutions in the embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION

In order to make the objectives, technical solutions and advantages of the present disclosure more clearly understood, the present disclosure is described in further detail below with reference to the accompanying drawings and particular embodiments. It should be understood that the particular embodiments described herein are for the purpose of explaining the present disclosure only and are not intended to limit the protection scope of the present disclosure.

Unless defined otherwise, all technical and scientific terms used herein have the same meanings as are commonly understood by those skilled in the art. The terms used herein in the specification of the present disclosure are for the purpose of describing specific embodiments only but not intended to limit the present disclosure.

For ease of understanding, the technical terms involved in the embodiments of the present disclosure are explained and described below at first.

An optical axis is a direction in which an optical system transmits light, referring to a chief ray of a central field of view. For a symmetrical transmission system, it generally coincides with a center line of rotation of the optical system.

A focal length, also called a focal distance, is a measure of convergence or divergence of light in the optical system. It refers to a distance from an optical center of a lens to a focal point when an infinitely distant object passes through the lens to form a clear image in a focal plane. For a prime lens, a position of the optical center is fixed, so the focal length is fixed; while for a zoom lens, a change in the optical center of the lens brings a change in the focal length of the lens, so the focal length is adjustable.

A long-focus lens refers to a photographic lens with a longer focal length than a standard lens, so the long-focus lens is also called a telephoto lens or a telescopic lens. The focal length varies from 100 mm to 800 mm, and some are even longer.

At present, electronic devices, such as mobile phones, tablet computers, cameras, monitoring devices and unmanned aerial vehicles, play an increasingly important role in people's lives, and also bring a lot of convenience and fun to people's lives. Cameras are an important part of electronic devices to capture images. There are various kinds and brands of electronic devices with an image acquisition function, so that lots of electronic devices are available for consumers to choose. How to gain the favor of consumers and enhance the competitiveness of products has become an increasingly important issue for electronic device manufacturers.

In order to be beautiful and convenient to carry, the electronic devices are also required to adapt to the development of miniaturization. In order to obtain a greater zoom ratio, the lens is becoming increasingly larger in size, which, together with the setting of a focusing space, leads to an increasing volume of the camera unit. As a result, a lot of internal space of the electronic device is occupied by the camera unit, which seriously affects the arrangement of other internal elements of the electronic device.

Thus, liquid lenses capable of adapting to the development of miniaturization of the electronic devices are increasingly applied to electronic devices (such as mobile phones and tablet computers). However, current camera units to which liquid lenses are applied have a low yield, leading to high costs of the camera units, which is not conducive to the application of the camera units to electronic devices and further restricts the miniaturization of the electronic devices.

In view of this, the present disclosure provides a camera unit, which, by optimizing an assembly structure, can increase a mass production yield of the camera unit according to the present disclosure, can reduce manufacturing costs of the camera unit according to the present disclosure, and then can reduce costs of application of the liquid lens to the electronic device.

The camera unit according to the present disclosure is described below with reference to the accompanying drawings.

Figure 2A:
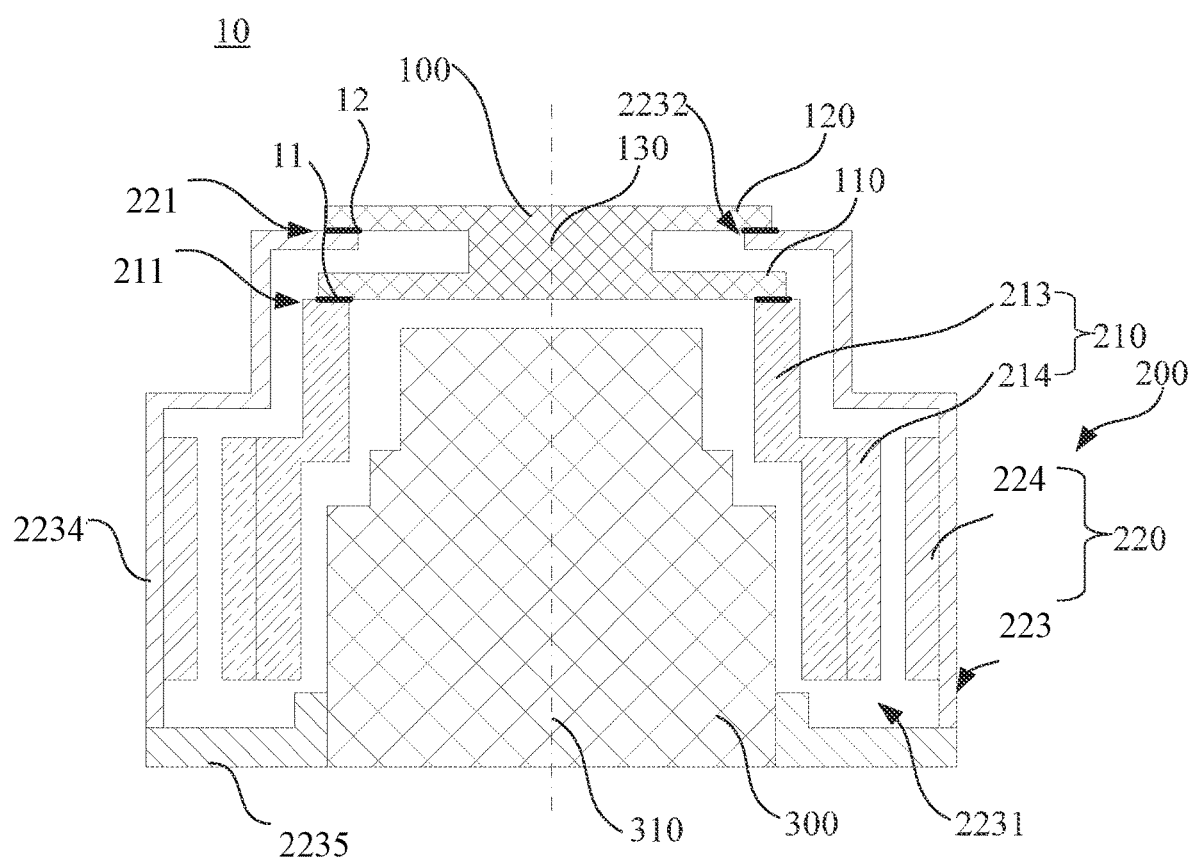
FIG. 2a is a schematic semi-sectional view of a camera unit according to another embodiment.
Figure 2B:
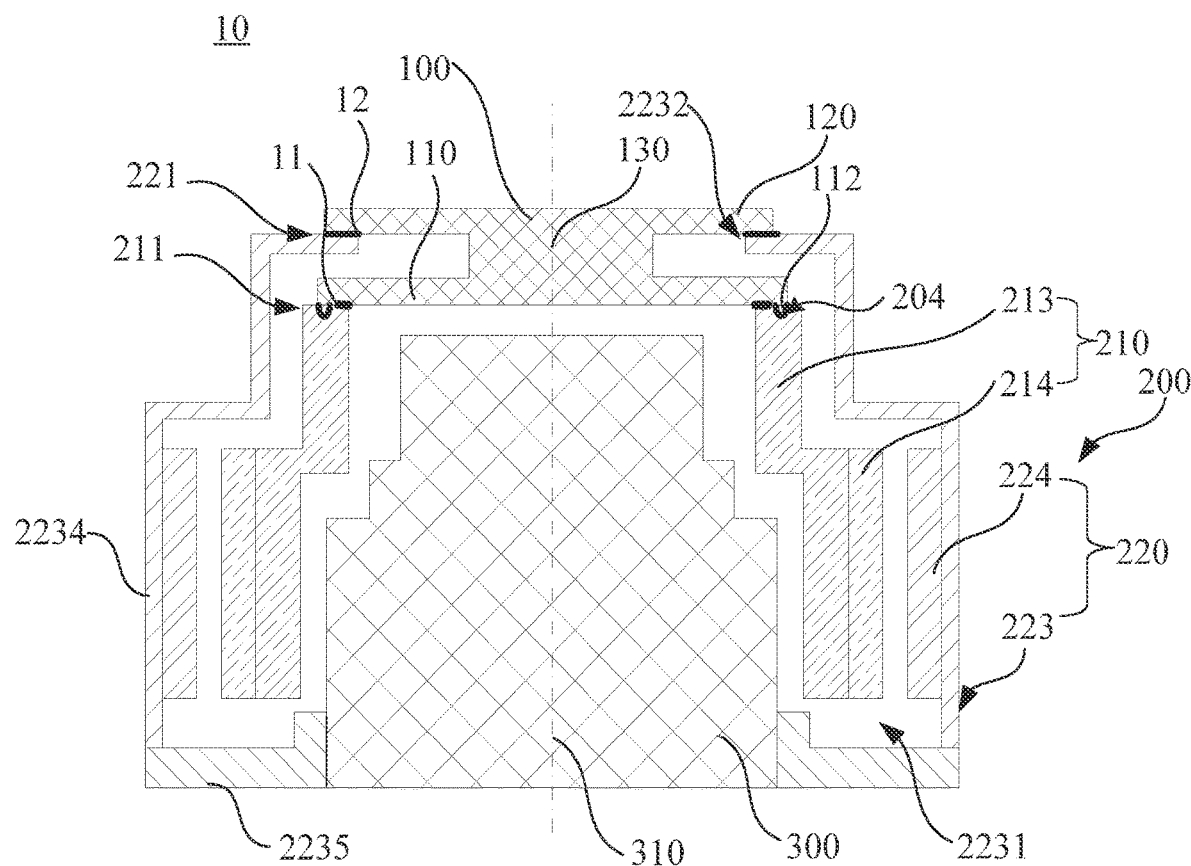
FIG. 2b is a schematic semi-sectional view of a camera unit according to yet another embodiment.
Figure 3:
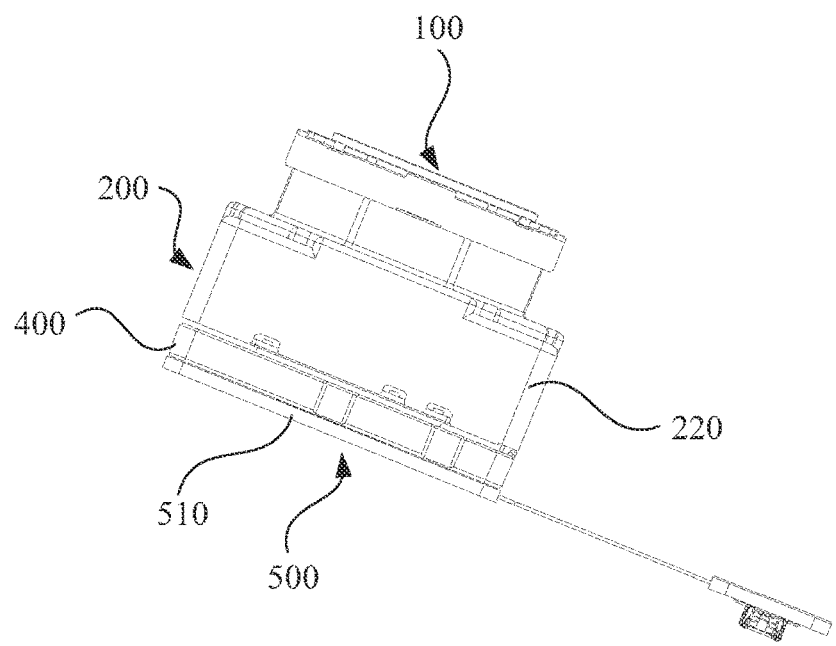
FIG. 3 is a schematic structural diagram of a camera unit according to another embodiment.
Figure 4:
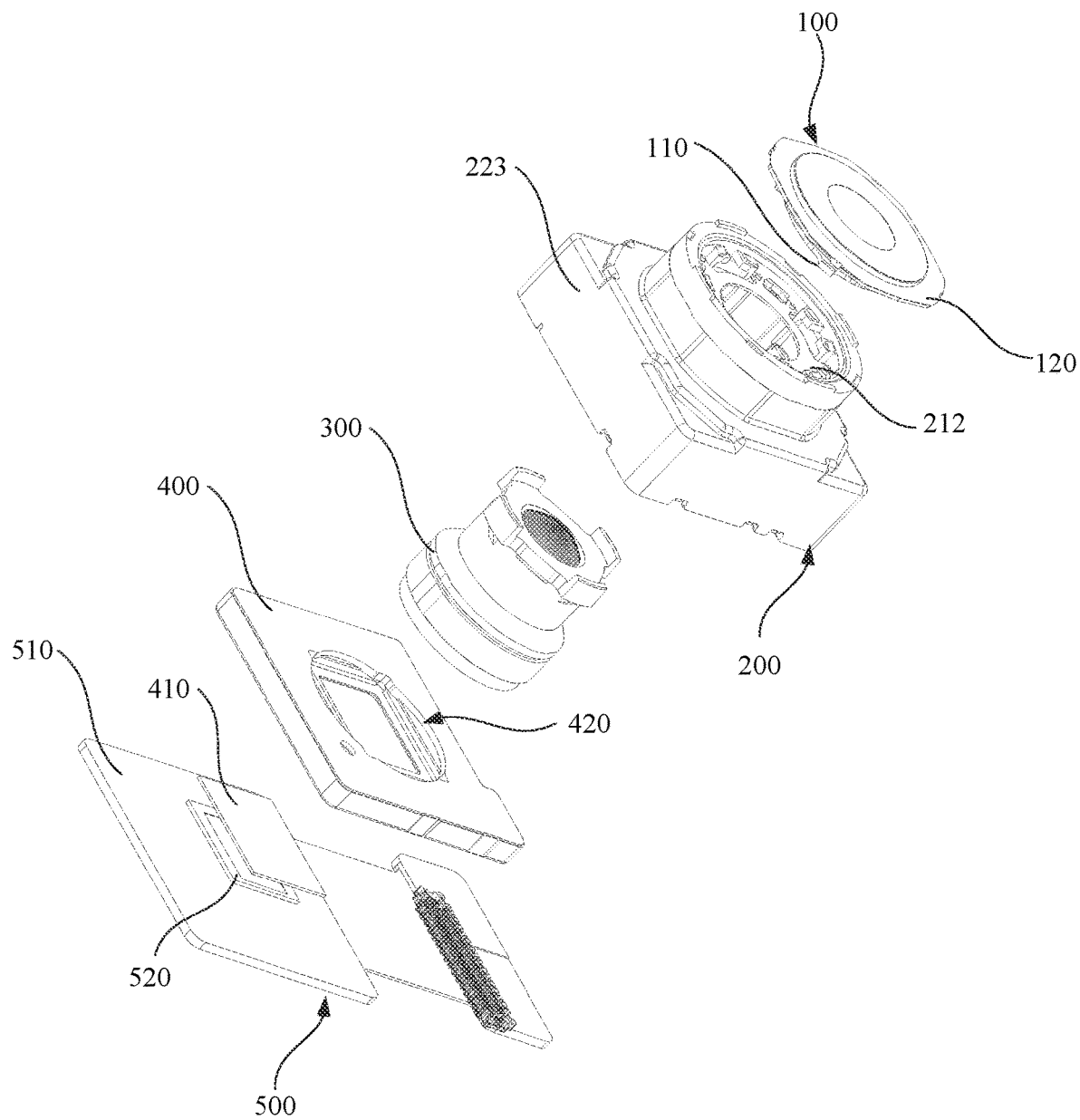
FIG. 4 is a schematic exploded structural diagram of the camera unit illustrated in FIG. 3.
Figure 5:
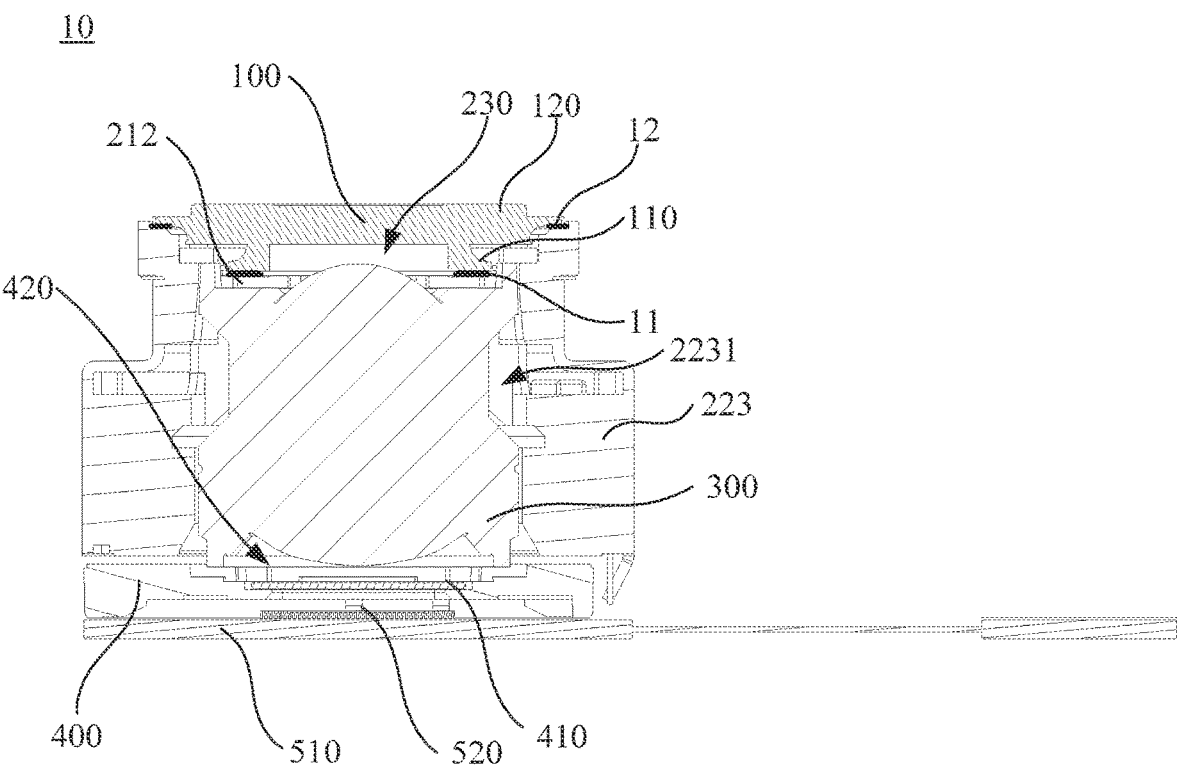
FIG. 5 is a schematic semi-sectional view of the camera unit illustrated in FIG. 3.
Figure 6:
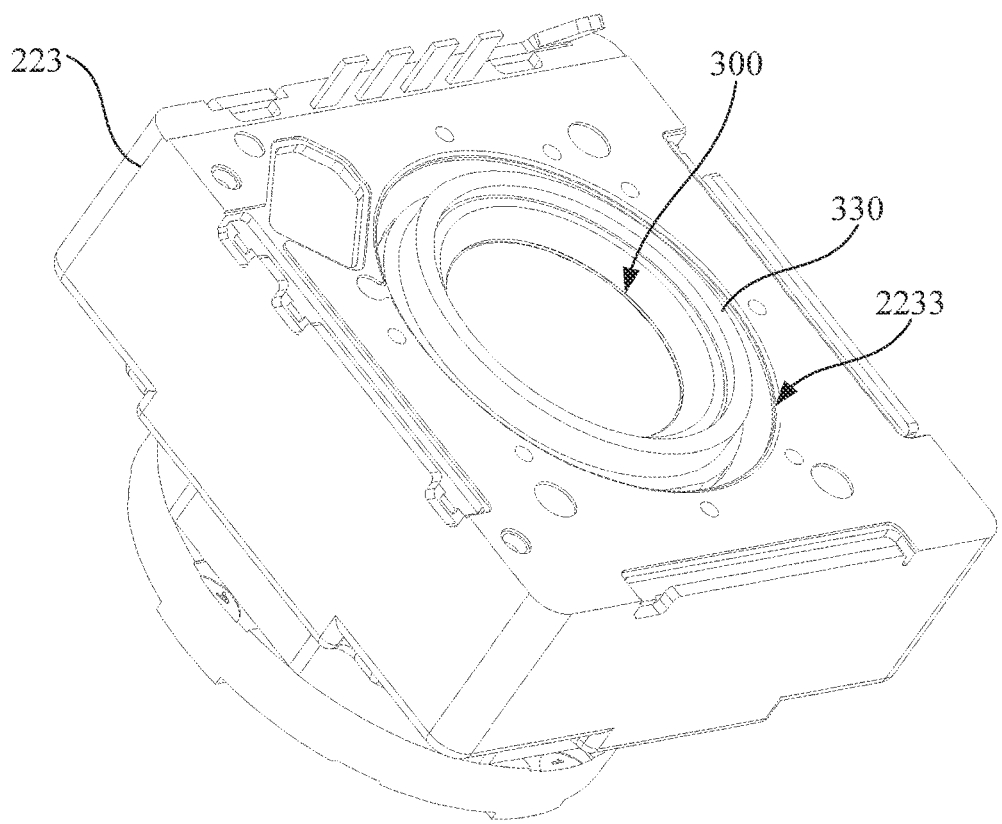
FIG. 6 is a schematic diagram of an assembly structure of a motor and a solid lens illustrated in FIG. 5.
Figure 7:
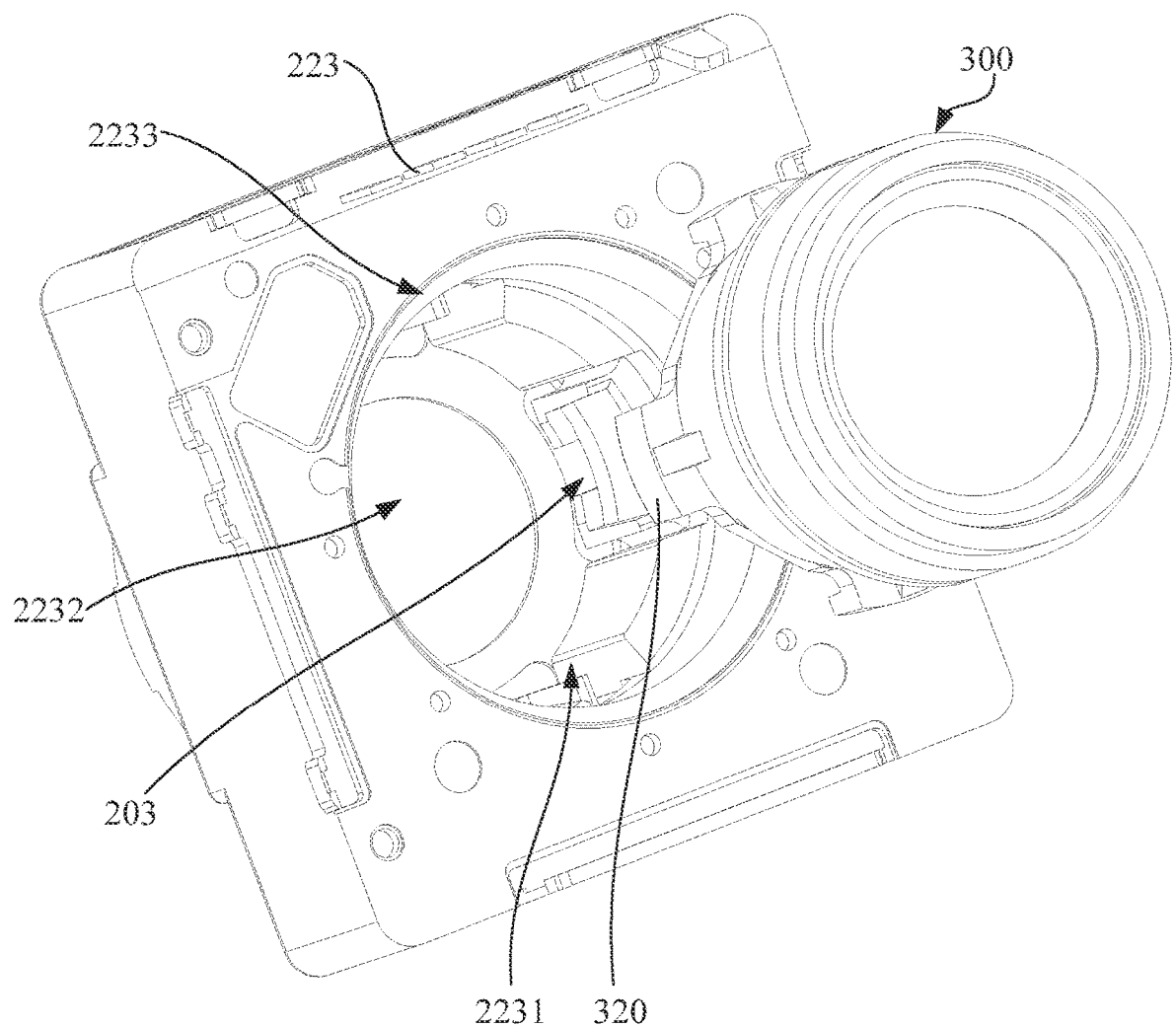
FIG. 7 is a schematic exploded structural diagram of the motor and the solid lens illustrated in FIG. 6.
Figure 8:
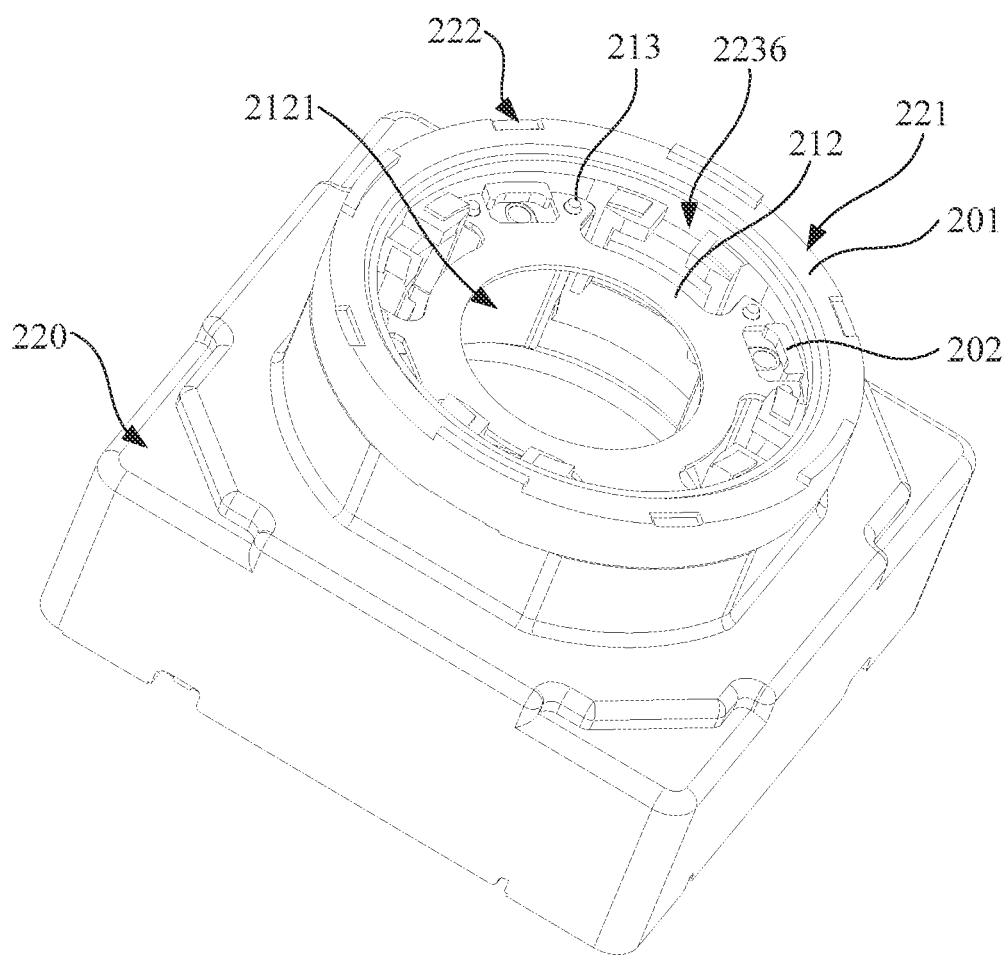
FIG. 8 is a schematic structural diagram of the motor illustrated in FIG. 5.
Figure 9:
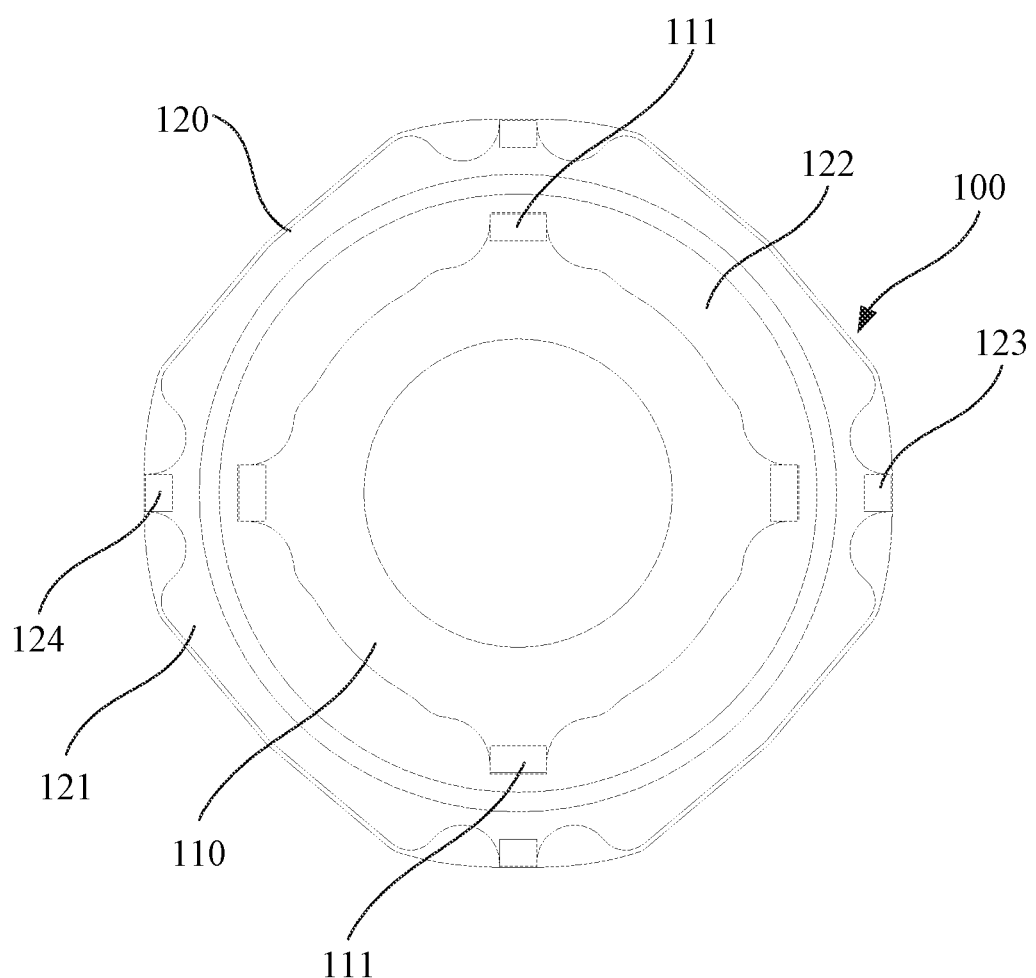
FIG. 9 is a schematic bottom view of a liquid lens illustrated in FIG. 4.
Figure 10:
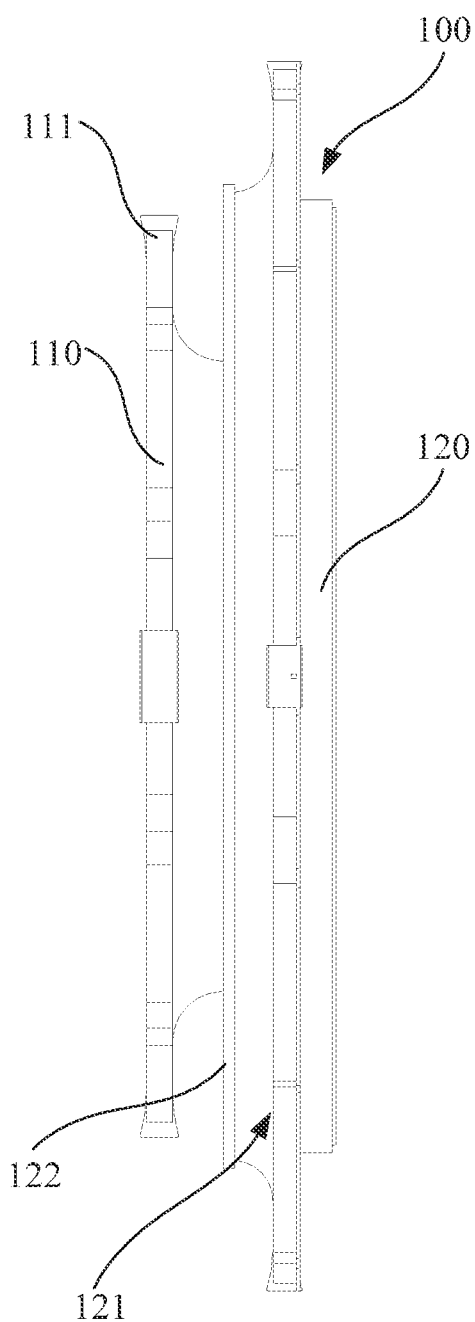
FIG. 10 is a schematic side view of the liquid lens illustrated in FIG. 9.

FIGS. 1 to 10 are structural views of the camera unit according to some embodiments. FIG. 1 is a schematic semi-sectional view of a camera unit according to an embodiment. FIG. 2*a* is a schematic semi-sectional view of a camera unit according to another embodiment. FIG. 2*b* is a schematic semi-sectional view of a camera unit according to yet another embodiment. FIG. 3 is a schematic structural diagram of a camera unit according to another embodiment. FIG. 4 is a schematic exploded structural diagram of the camera unit illustrated in FIG. 3. FIG. 5 is a schematic semi-sectional view of the camera unit illustrated in FIG. 3. FIG. 6 is a schematic diagram of an assembly structure of a motor and a solid lens illustrated in FIG. 5. FIG. 7 is a schematic exploded structural diagram of the motor and the solid lens illustrated in FIG. 6. FIG. 8 is a schematic structural diagram of the motor illustrated in FIG. 5. FIG. 9 is a schematic bottom view of a liquid lens illustrated in FIG. 4. FIG. 10 is a schematic side view of the liquid lens illustrated in FIG. 9.

In some embodiments of the present disclosure, as illustrated in FIG. 1, 2*a*, 2*b* or 3 to 5, a camera unit 10 is provided, including a liquid lens 100, a motor 200 and a solid lens 300. The liquid lens 100 includes a fixed body 120 and a support body 110 spaced apart from the fixed body 120. The liquid lens 100 is provided with a first optical axis 130. The motor 200 includes a mover assembly 210 and a stator assembly 220. The mover assembly 210 includes a first end 211 fixedly connected to the support body 110. The mover assembly 210 is movable in a direction of the first optical axis 130 relative to the stator assembly 220 and configured to adjust curvature of the liquid lens 100. The stator assembly 220 includes a second end 221 fixedly connected to the fixed body 120. The solid lens 300 is fixed to the stator assembly 220, and the solid lens 300 includes a second optical axis 310 coinciding with the first optical axis 130.

In this way, during assembly of the camera unit 10 of the present disclosure, the fixed body 120 is fixedly connected to the second end 221, and the support body 110 is fixedly connected to the first end 211, so that the liquid lens 100 is assembled to the motor 200; when the solid lens 300 can also be separately assembled into the motor 200, the second optical axis 310 coincides with the first optical axis 130. In this way, the liquid lens 100 and the solid lens 300 are assembled to the motor 200 separately, and a manufacturing error of the solid lens 300 and an assembly error between the solid lens and the motor 200 may not lead to accumulation of assembly errors for mounting of the liquid lens 100 and not affect mounting accuracy of the liquid lens 100, so that the second optical axis 310 of the solid lens 300 is accurately aligned with the first optical axis 130 of the liquid lens 100. Even during the mounting of the liquid lens 100, a mounting error of the liquid lens 100 can be fine-tuned according to an error of the solid lens 300, so that the first optical axis 130 of the liquid lens 100 is more accurately aligned with the second optical axis 310 of the solid lens 300, to make the accuracy of the camera unit meet a design requirement and reduce a rejection rate. That is, the structure of the camera unit according to the present disclosure can reduce accumulation of errors, and then the yield of the camera unit according to the present disclosure can be increased, which is conducive to reducing production costs of the camera unit according to the present disclosure, and facilitates application of the camera unit according to the present disclosure to electronic devices to meet the requirements for miniaturization of the electronic devices.

It could be understood that, the camera unit according to the present disclosure uses a liquid lens, and further has the following advantages: the liquid lens 100 is a liquid lens with variable curvature. The focal power can be continuously changed by driving and controlling the liquid lens, so as to achieve continuous focusing from a long shot to a close-up shot. Such focusing reduces the requirements for a drive stroke of the motor 200 and can realize close-range focusing, greatly increasing an optical magnification and realizing background blurry macro photography close to a common viewing angle of a single-lens reflex camera. When the liquid material for the liquid lens 100 has the properties of ultra-low refractive index and ultra-low dispersion, even lower than fluorite used for ultra-telephoto lenses of the single-lens reflex camera, chromatic aberration changes during focusing are greatly reduced. Therefore, combined with electronic zoom, the liquid lens 100 can achieve macro imaging with a higher magnification. That is, the camera unit according to the present disclosure can fully reduce the size of the whole unit while ensuring a macro effect, to adapt to the miniaturization of electronic devices.

In addition, the liquid lens 100 is applied to the camera unit according to the present disclosure, which can also reduce a field of view (FOV) change from a long shot to a close-up shot, has almost no breathing effect from a long shot to a normal close-up shot, and is suitable for animation shooting.

It should be noted that during assembly of the camera unit according to the present disclosure, the solid lens 300 may be mounted prior to the liquid lens 100; or the liquid lens 100 may be mounted prior to the solid lens 300, and a mounting position of the solid lens 300 may be fine-tuned, so that the first optical axis 130 of the liquid lens 100 is more accurately aligned with the second optical axis 310 of the solid lens 300.

It should be noted that the "liquid lens 100" can be implemented in a variety of ways.

In an example, the liquid lens 100 includes a lens body (not labeled) and a liquid (not illustrated) provided in the lens body. The lens body is provided with a movable support body 110. In this way, through the motion of the mover assembly 210, the support body 110 is squeezed or pulled to change a shape of the lens body, and then a shape of the liquid inside the lens body is adjusted, so that the curvature of the liquid lens 100 can be adjusted and the focal length of the liquid lens 100 changes accordingly.

It should be noted that the "fixed connection" between the stator assembly 220 and the fixed body 120 is implemented by, but not limited to, at least one of snap-fit, screwing, bonding, welding and fusion.

Similarly, the "fixed connection" between the mover assembly 210 and the support body 110 is implemented by, but not limited to, at least one of snap-fit, screwing, bonding, welding and fusion.

A traditional camera unit is composed of the solid lens 300. The solid lens 300 includes a lens group including a plurality of lenses (not illustrated). The motor 200 directly drives an entire lens barrel, to which the lens group is fixed, to move by a certain distance or rotate by a certain angle, to realize automatic focus and/or optical image stabilization.

A traditional solid lens is made of a lens material such as glass, optical plastic and so on, with a fixed radius of curvature after a forming process. The solid lens is mounted on the drive of the motor 200 and moves in an optical axial direction to change a focus position, so as to realize continuous focus from a long shot to a close-up shot. A limitation of the traditional solid lens is as follows: when the lens group is moved to achieve macro imaging, the amount of move stoke increases; especially when extreme close-up imaging by the long-focus lens, too much movement is required, but the motor 200 has a limited stroke or an electronic device has a limited internal space, which makes it difficult to implement on electronic devices such as mobile phones and tablet computers. Especially when a long focal length adjustment is achieved by the solid lens 300, the motor 200 is required to have a long enough stroke, and the electronic device is also required to reserve enough space, which is not conducive to the miniaturization of the electronic device or cannot be used on small electronic devices.

As illustrated in FIG. 1, 2a, 2b, or 5, in some embodiments, the stator assembly 220 includes a housing 223 provided with the second end 221, the housing 223 is provided with an accommodating cavity 2231 and a first opening 2232 communicated with the accommodating cavity 2231, and the first opening 2232 is defined in the second end 221. The mover assembly 210 is arranged in the accommodating cavity 2231, and the support body 110 passes through the first opening 2232 and is fixedly connected to the mover assembly 210. In this way, the mover assembly 210 is arranged in the accommodating cavity 2231 and is protected by the housing 223, which is conducive to prolonging the service life of the mover assembly 210 and reducing the interference during operation, so as to improve the accuracy of the motor 200.

As illustrated in FIG. 1, 2a, or 2b, in some embodiments, the stator assembly 220 includes a magnet unit 224, and the magnet unit 224 is arranged on a sidewall of the accommodating cavity 2231. The mover assembly 210 includes a movable bracket 213 and a voice coil unit 214 arranged on the movable bracket 213, the movable bracket 213 is spaced apart from the sidewall of the accommodating cavity 2231, an end of the movable bracket 213 is bonded to the support body 110, and the voice coil unit 214 is in magnetic excitation coupling with the magnet unit 224. In this way, through the magnetic excitation coupling between the voice coil unit 214 and the magnet unit 224, a voice coil moves relative to the magnet unit 224, then can drive the movable bracket 213 to move, and finally transfers displacement force to the support body 110, so to achieve curvature adjustment of the liquid lens 100 by the motor 200.

Further, referring to FIG. 5, in an embodiment, the mover assembly 210 further includes an elastic piece 212, the elastic piece 212 is fixedly connected to the movable bracket 213, and the movable bracket 213 is fixedly connected to the support body 110 through the elastic piece 212, such that the movable bracket 213 squeezes or pulls the liquid lens 100 through the elastic piece 212. In this way, the movable bracket 213 can be combined with the elastic piece 212 in the above embodiment to squeeze or pull the liquid lens 100 to adjust the shape of the liquid inside the lens body. Moreover, after driving force generated by the magnet unit 224 is withdrawn, the elastic piece 212 can be automatically restore and then drive the liquid lens 100, the movable bracket 213 and the voice coil unit 214 to restore.

As illustrated in FIGS. 6 and 7, in an embodiment, the housing 223 includes a catching portion 203 arranged in the accommodating cavity 2231. The solid lens 300 is at least partially arranged in the accommodating cavity 2231, and the solid lens 300 includes a snap portion 320 in snap-fit with the catching portion 203. In this way, through the snap-fit between the catching portion 203 and the snap portion 320, the solid lens 300 can be arranged in the accommodating cavity 2231 by snap-fit, which is conducive to improving the mounting efficiency.

Further, in an embodiment, the housing 223 is provided with a second opening 2233 communicated with the accommodating cavity 2231, the second opening 2233 is opposite the first opening 2232, and the catching portion 203 is arranged close to the first opening 2232. In this way, the second opening 2233 is used as an entrance for the mounting of the solid lens 300, so that the solid lens 300 is easily inserted into the accommodating cavity 2231 from the second opening 2233 and the snap portion 320 is snap-fitted with the catching portion 203.

In addition, in an embodiment, the solid lens 300 includes a third end 330 opposite the snap portion 320, and the third end 330 is arranged at the second opening 2233 and bonded to the housing 223. In this way, when fixed to the housing 223 through the fit between the snap portion 320 and the catching portion 203, the solid lens 300 can be further fixed by an adhesive, so that the solid lens 300 is firmly fixed to the housing 223, which can improve the crash resistance of the camera unit according to the present disclosure and improve the reliability of the camera unit according to the present disclosure.

It should be noted that the solid lens 300 may be fixed to the housing 223 in a variety of manners. As illustrated in FIG. 2a, in another embodiment, the housing 223 includes an annular casing 2234 and a base 2235. The annular casing 2234 is hollow, and a first end of the annular casing 2234 is provided with the first opening 2232. The solid lens 300 is fixedly arranged on the base 2235, and the base 2235 is arranged on a second end of the annular casing and is fixedly connected to the annular casing 2234 to form the accommodating cavity 2231. In this way, the solid lens 300 may be modularly mounted to the base 2235, the stator assembly 220 and the mover assembly 210 may be modularly mounted to the annular casing 2234, and then the base 2235 is assembled to the annular casing 2234; that is, the solid lens 300 may also be assembled to the motor 200 at the same time, which is conducive to improving the assembly efficiency.

As illustrated in FIGS. 8 to 10, in some embodiments, the housing 223 is provided with a guide portion 2236, and a guide direction of the guide portion 2236 is arranged along a depth direction of the accommodating cavity 2231. The support body 110 includes a limit portion 111, and the limit portion 111 is in pilot fit with the guide portion 2236 to limit a movement range of the support body 110 in an axial direction of the first optical axis 130. In this way, the movement range of the support body 110 can be limited through the fit between the limit portion 111 and the guide portion 2236, which is conducive to ensuring the reliability of the focusing process of the liquid lens 100.

The guide portion 2236 and the limit portion 111 may have a variety of specific fitting structures, including, but not limited to, a guide rail and a guide block, a sliding slot and a sliding block, and so on.

In some embodiments, the solid lens 300 fits with the liquid lens 100 to form a structure of a long-focus lens. In this way, the movement stroke can be reduced compared with a traditional long-focus lens. At the same time, the size of the unit is fully reduced while a macro effect is ensured. Moreover, a traditional Hall sensor can accurately sense an actual position of the solid lens 300, which is conducive to reducing application costs.

In an example, a closest focusing distance F in a focusing range of the long-focus lens is ≤1 cm. Then, the camera unit according to the present disclosure can achieve ultra-macro adjustment and has better image acquisition performance. For example, the closest focusing distance F in the focusing range is 1 cm, the corresponding focusing range may range from 1 cm to infinity; or if the closest focusing distance F in the focusing range is 1.5 cm, the corresponding focusing range may range from 1.5 cm to infinity; or if the closest focusing distance F in the focusing range is 2 cm, the corresponding focusing range may range from 2 cm to infinity; or if the closest focusing distance F in the focusing range is 3 cm, the corresponding focusing range may range from 3 cm to infinity; or if the closest focusing distance F in the focusing range is 7 cm, the corresponding focusing range may range from 7 cm to infinity; or if the closest focusing distance F in the focusing range is 10 cm, the corresponding focusing range may range from 10 cm to infinity; or if the closest focusing distance F in the focusing range is 20 cm, the corresponding focusing range may range from 20 cm to infinity; or if the closest focusing distance F in the focusing range is 30 cm, the corresponding focusing range may range from 30 cm to infinity, and so on.

Similarly, the closest focusing distance F in the focusing range of the long-focus lens of the present disclosure may also be ≤2 cm; ≤3 cm; ≤7 cm; ≤10 cm; ≤20 cm; ≤30 cm and so on.

In some embodiments, the first end 211 is bonded to the support body 110. In this way, during assembly of the camera unit according to the present disclosure, initial bonding may be performed first in the process of bonding the first end 211 to the support body 110. At this point, a position relationship between moving parts of the liquid lens 100 and moving parts of the motor 200 can still be fine-tuned; that is, a position relationship between the mover assembly 210 and the support body 110 can be fine-tuned. The liquid lens 100 and the motor 200 are bonded firmly when their positions meet an assembly requirement. Then, a positioning error and/or a manufacturing error of the liquid lens 100 and the motor 200 can be calibrated, so that an assembly error of the liquid lens 100 and the motor 200 meets a production requirement, so as to make the accuracy of the camera unit meet the design requirement, which can further increase a yield of the camera unit according to the present disclosure and is conducive to reducing production costs of the camera unit according to the present disclosure.

As illustrated in FIG. 2a, 2b or 5, in an embodiment, the camera unit 10 further includes a first bonding layer 11, and the first end 211 is bonded to the support body 110 through the first bonding layer 11. In this way, the mover assembly 210 and the support body 110 are easily bonded using the first bonding layer 11. A solid or liquid adhesive or a double-sided adhesive may be provided on the mover assembly 210 to facilitate initial bonding, so as to calibrate the positioning error or manufacturing error, etc., and then be solidified to firmly bond the mover assembly 210 to the support body 110.

In some embodiments, the first bonding layer 11 is formed by solidification of the adhesive. In this way, after the mover assembly 210 and the support body 110 are initially bonded using the adhesive, it is possible to test, during gradual solidification, whether the assembly error of the two meets a requirement, and if not, fine-tuning may be performed, so that the assembly error of the liquid lens 100 and the motor 200 meets the production requirement, to ensure the accuracy of the camera unit. The adhesive includes, but is not limited to, a thermally curable adhesive, an ultraviolet curable adhesive, and the like.

On the basis of any one of the above embodiments, in some embodiments, the second end 221 is bonded to the fixed body 120. In this way, the stator assembly 220 and the fixed body 120 can also be initially bonded and adaptively fine-tuned, which further improves the flexibility of the adjustment between the liquid lens 100 and the motor 200, to calibrate larger manufacturing errors and reduce the accumulation of manufacturing errors that may affect the assembly accuracy.

As illustrated in FIG. 2a, 2b, or 5, in an example, the camera unit 10 further includes a second bonding layer 12, and the second end 221 is bonded to the fixed body 120 through the second bonding layer 12. In this way, the stator assembly 220 and the fixed body 120 are easily bonded using the second bonding layer 12. A solid or liquid adhesive or a double-sided adhesive may be provided on the stator assembly 220 to facilitate initial bonding, to calibrate the positioning error or manufacturing error, etc., and then be solidified to firmly bond the stator assembly 220 to the fixed body 120.

In some embodiments, the second bonding layer 12 is formed by solidification of the adhesive. In this way, after the stator assembly 220 and the fixed body 120 are initially bonded using the adhesive, it is possible to test, during gradual solidification, whether the assembly error of the two meets a requirement, and if not, fine-tuning may be performed, so that the assembly error of the liquid lens 100 and the motor 200 meets the production requirement, to ensure the accuracy of the camera unit. The adhesive includes, but is not limited to, a thermally curable adhesive, a UV curable adhesive, and the like.

Similarly, the solid lens 300 and the stator assembly 220 may also be bonded using an adhesive, so that initial bonding can be performed prior to solidification, making it easy to perform fine-tuning during the solidification, to improve the mounting accuracy of the solid lens 300 and the stator assembly 220, which is conducive to improving the image acquisition accuracy of the camera unit.

As illustrated in FIG. 5 or 8, in some embodiments, the mover assembly 210 further includes an elastic piece 212, the first end 211 is fixedly connected to the support body 110 via the elastic piece 212, and the mover assembly 210 squeezes or pulls the liquid lens 100 via the elastic piece 212. The liquid lens 100 is squeezed or pulled via the elastic piece 212, to adjust the shape of the liquid inside the lens body. After driving force generated by the mover assembly 210 is withdrawn, the elastic piece 212 can be automatically restore and then drive the liquid lens 100 to restore.

In some embodiments, the elastic piece 212 is bonded to the support body 110. In this way, the first end 211 is bonded to the support body 110 via the elastic piece 212, so that initial bonding can be performed first in the process of bonding the support body 110. At this point, a position relationship between moving parts of the liquid lens 100 and moving parts of the motor 200 can still be fine-tuned; that is, a position relationship between the mover assembly 210 and the support body 110 can be fine-tuned. The liquid lens 100 and the motor 200 are bonded firmly when their positions meet an assembly requirement, so that the liquid lens 100 can be automatically elastically restore with high mounting accuracy.

In an example, the elastic piece 212 is provided with a through hole 2121 in a middle portion of the elastic piece 212, a first avoidance space 230 is provided between the elastic piece 212 and the liquid lens 100, and the first avoidance space 230 is communicated with the through hole 2121. In this way, the solid lens 300 can be arranged in the first avoidance space 230 through the through hole 2121, which makes full use of the space, so that the structure of the camera unit is more compact, facilitating the miniaturization design of the camera unit. At the same time, the liquid lens 100 may also deform by using the first avoidance space 230, which makes full use of the internal space of the camera unit.

As illustrated in FIGS. 8 to 10, in an embodiment, the second end 221 includes a first glue carrying surface 201 and a receiving surface 202, the first glue carrying surface 201 is arranged on an end face of the second end 221, and the receiving surface 202 is arranged below the first glue carrying surface 201. The fixed body 120 includes a second glue carrying surface 121 opposite the first glue carrying surface 201 and a fitting surface 122 in contact with the receiving surface 202. In this way, glue can be carried using the first glue carrying surface 201 and/or the second glue carrying surface 121. For example, the glue is provided on the first glue carrying surface 201 by a glue dispenser, and then the fitting surface 122 of the fixed body 120 is arranged on the receiving surface 202, so that the second glue carrying surface 121 and the first glue carrying surface 201 are fixed by glue. At the same time, excessive pulling of the liquid lens can be avoided by fitting the receiving surface 202 with the fitting surface 122.

In some embodiments, the liquid lens 100 and the motor 200 are better aligned using a positioning structure, to improve the assembly accuracy of the two.

As illustrated in FIG. 2b, the first end 211 is provided with a first positioning portion 204, and the support body 110 is provided with a second positioning portion 112 in location fit with the first positioning portion. In this way, the assembly accuracy of the first end 211 and the support body 110 can be improved by using location fit between the first positioning portion 204 and the second positioning portion 112.

In an example, the second end 221 is provided with a third positioning portion 222, and the fixed body 120 is provided with a fourth positioning portion 123 in location fit with the third positioning portion. In this way, the assembly accuracy of the second end 221 and the fixed body 120 can be improved by using location fit of the third positioning portion 222 and the fourth third positioning portion.

It should be noted that "the first positioning portion" and "the second positioning portion" as well as "the third positioning portion" and "the fourth positioning portion" may have a variety of specific structures therebetween, including, but not limited to, at least one of a positioning projection and a positioning recess, a positioning projection and a positioning hole, and the like.

In an example, the third positioning portion 222 is provided with a recess, and the fourth positioning portion 123 is provided with a projection fitting into the recess. In this way, the fitting of the projection and the recess can not only realize the positioning of the fixed body 120 and the second end 221 during assembly, but also play a limiting role, to further improve the assembly accuracy of the two and improve the reliability of the fixation of the two.

As illustrated in FIGS. 3 to 5, in some embodiments, the camera unit further includes a substrate 400, the substrate 400 is fixed to the stator assembly 220, the substrate 400 is provided with a filter 410, and the filter 410 is spaced apart from the solid lens 300 to form a second avoidance space 420. In this way, the filter 410 is fixed to the stator assembly 220 via the substrate 400 and can filter light output by the solid lens 300, which can reduce interference, to improve effective light obtained by the image sensor 520. At the same time, a focusing space of the solid lens 300 is formed by using the second avoidance space 420, to facilitate the focusing of the solid lens 300.

The filter 410 is an infrared filter 410, which can filter infrared light and reduce the interference of the infrared light in acquisition of particular images.

Further, in an embodiment, the camera unit further includes an image sensing assembly 500, the image sensing assembly 500 includes an image transmission circuit board 510 and an image sensor 520 arranged on the image transmission circuit board 510, and the image sensor 520 is arranged directly under the filter 410. In this way, the image sensing assembly 500 can be directly integrated into the camera unit, which is conducive to improving the assembly efficiency of the electronic device and is conducive to ensuring that the electronic device can obtain image information without the interference from an assembly error of the camera unit in the electronic device, to improve the accuracy of the image information obtained by the electronic device.

Figure 11:
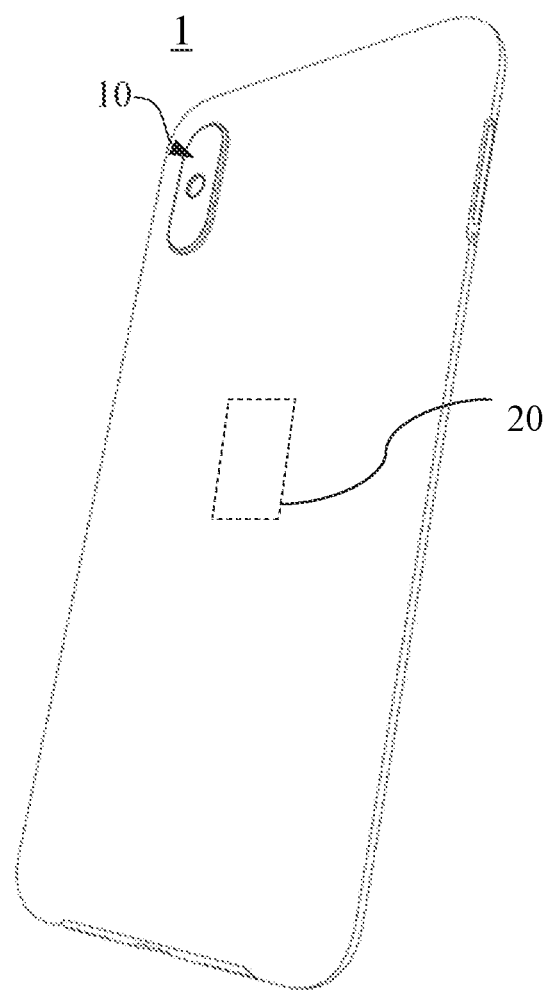
FIG. 11 is a schematic diagram of an electronic device according to an embodiment.

According to another embodiment of the embodiments of the present disclosure, as illustrated in FIG. 11, an electronic device 1 is further provided, including a controller 20 and the camera unit 10 according to any one of the above embodiments, the controller 20 being in a communication connection with the motor.

By using the camera unit 10 described above, the electronic device 1 according to the present disclosure can be miniaturized in the case of having the same focusing range, especially in the case of being able to achieve ultra-close focusing. In addition, the production costs of the camera unit 10 of the present disclosure are low, which is conducive to reducing the production costs of the electronic device 1 according to the present disclosure.

The electronic device may include a hand-held device, a vehicle-mounted device, a wearable device, a surveillance device, a cellular phone, a smart phone, a personal digital assistant (PDA) computer, a tablet computer, a portable computer, a laptop computer, a video camera, a video recorder, a camera, a smart watch, a smart wristband, an on-board computer and other electronic devices with an imaging function.

Technical features of the above embodiments may be combined randomly. To make descriptions brief, not all possible combinations of the technical features in the embodiments are described. Therefore, as long as there is no contradiction between the combinations of the technical features, they should all be considered as scopes disclosed in the specification.

The above embodiments only describe several implementations of the present disclosure, which are described specifically and in detail, and therefore cannot be construed as a limitation on the patent scope of the present invention. It should be pointed out that those of ordinary skill in the art may also make several changes and improvements without departing from the ideas of the present disclosure, all of which fall within the protection scope of the present disclosure.

What is claimed is:

1. A camera unit, comprising:
    a liquid lens comprising a fixed body and a support body spaced apart from the fixed body, the liquid lens having a first optical axis;
    a motor comprising a mover assembly and a stator assembly, the mover assembly having a first end fixedly connected to the support body and being movable along the first optical axis relative to the stator assembly to adjust curvature of the liquid lens, the stator assembly having a second end fixedly connected to the fixed body; and
    a solid lens fixed to the stator assembly and having a second optical axis coinciding with the first optical axis,
    wherein the stator assembly comprises a housing provided with the second end, the housing defines an accommodating cavity and a first opening communicated with the accommodating cavity, the first opening is defined in the second end, the mover assembly is arranged in the accommodating cavity, and the support body passes through the first opening and is fixedly connected to the mover assembly.

2. The camera unit according to claim 1, wherein at least one of:
    the first end is bonded to the support body; and
    the second end is bonded to the fixed body.

3. The camera unit according to claim 1, wherein the camera unit further comprises at least one of:
    a first bonding layer, the first end being bonded to the support body via the first bonding layer; and,
    a second bonding layer, the second end is bonded to the fixed body through the second bonding layer.

4. The camera unit according to claim 1, wherein the mover assembly further comprises an elastic piece, the first end is fixedly connected to the support body via the elastic piece, and the mover assembly squeezes or pulls the liquid lens via the elastic piece.

5. The camera unit according to claim 4, wherein the elastic piece is bonded to the support body.

6. The camera unit according to claim 4, wherein the elastic piece defines a through hole in a middle portion thereof, a first avoidance space is defined between the elastic piece and the liquid lens, and the first avoidance space is communicated with the through hole.

7. The camera unit according to claim 1, wherein the second end comprises a first glue carrying surface and a receiving surface, the first glue carrying surface being arranged on an end face of the second end, and the receiving surface being arranged below the first glue carrying surface; and the fixed body comprises a second glue carrying surface opposite the first glue carrying surface and a fitting surface in contact with the receiving surface.

8. The camera unit according to claim 1, wherein at least one of:
    the first end is provided with a first positioning portion, and the support body is provided with a second positioning portion in location fit with the first positioning portion; and
    the second end is provided with a third positioning portion, and the fixed body is provided with a fourth positioning portion in location fit with the third positioning portion.

9. The camera unit according to claim 1, wherein the solid lens fits with the liquid lens to form a structure of a long-focus lens.

10. The camera unit according to claim 9, wherein a closest focusing distance F in a focusing range of the long-focus lens is greater than or equal to 1 cm.

11. The camera unit according to claim 1, wherein the camera unit further comprises a substrate fixed to the stator assembly and provided with a filter, and the filter is spaced apart from the solid lens to define a second avoidance space therebetween.

12. The camera unit according to claim 1, wherein the housing is provided with a guide portion, a guide direction of the guide portion is arranged along a depth direction of the accommodating cavity, the support body comprises a limit portion, and the limit portion fits with the guide portion to limit a movement range of the support body along the first optical axis.

13. The camera unit according to claim 1, wherein the housing comprises a catching portion arranged in the accommodating cavity; and the solid lens is at least partially arranged in the accommodating cavity, and the solid lens comprises a snap portion in snap-fit with the catching portion.

14. The camera unit according to claim 13, wherein the housing defines a second opening communicated with the accommodating cavity, the second opening is opposite the first opening, and the catching portion is arranged close to the first opening.

15. The camera unit according to claim 14, wherein the solid lens comprises a third end opposite the snap portion, and the third end is arranged at the second opening and bonded to the housing.

16. The camera unit according to claim 1, wherein the housing comprises an annular casing and a base, the annular casing is hollow, the first opening is defined in a first end of the annular casing, the solid lens is fixedly arranged on the base, and the base is arranged on a second end of the annular casing and is fixedly connected to the annular casing to define the accommodating cavity.

17. The camera unit according to claim 1, wherein the stator assembly comprises a magnet unit, the magnet unit is arranged on a sidewall of the accommodating cavity; the mover assembly further comprises a movable bracket provided with the first end and a voice coil unit arranged on the movable bracket, the movable bracket is spaced apart from the sidewall of the accommodating cavity, and the voice coil unit is in magnetic excitation coupling with the magnet unit.

18. The camera unit according to claim 17, wherein the mover assembly further comprises an elastic piece, the elastic piece is fixedly connected to the movable bracket, and the movable bracket is fixedly connected to the support body through the elastic piece, to make the movable bracket squeeze or pull the liquid lens through the elastic piece.

19. An electronic device, comprising:
a controller; and
a camera unit comprising:
  a liquid lens comprising a fixed body and a support body spaced apart from the fixed body, the liquid lens having a first optical axis,
  a motor comprising a mover assembly and a stator assembly, the mover assembly having a first end fixedly connected to the support body and being movable along the first optical axis relative to the stator assembly to adjust curvature of the liquid lens, the stator assembly having a second end fixedly connected to the fixed body, and
  a solid lens fixed to the stator assembly and having a second optical axis coinciding with the first optical axis,
wherein the controller is in a communication connection with the motor,
wherein the stator assembly comprises a housing provided with the second end, the housing defines an accommodating cavity and a first opening communicated with the accommodating cavity, the first opening is defined in the second end, the mover assembly is arranged in the accommodating cavity, and the support body passes through the first opening and is fixedly connected to the mover assembly.

* * * * *